Patented Dec. 1, 1942

2,303,537

UNITED STATES PATENT OFFICE 2,303,537

PRODUCTION OF HYDROGEN CHLORIDE

Frank L. Frost, Jr., Wilmington, Del., assignor to E. I. du Pont de Nemours & Company, Wilmington, Del., a corporation of Delaware No Drawing. Application November 13, 1940, Serial No. 365,488

13 Claims. (Cl. 23—154)

This invention relates to the manufacture of anhydrous hydrochloric acid (hydrogen chloride) from aqueous hydrochloric acid.

Because anhydrous hydrochloric acid is not generally available on the market various methods have been suggested for its production from aqueous hydrochloric acid. None of the methods heretofore available, however, has been entirely satisfactory. Thus, while it has been proposed to produce anhydrous hydrochloric acid by stripping aqueous hydrochloric acid with concentrated sulfuric acid, calcium chloride and like dehydrating agents, the large quantity of dilute solutions of these agents which is produced makes it essential to economic operation that facilities be provided for concentrating the dehydrating agents in order that they may be re-used. Otherwise, the quantity of dehydrating agent lost through the operation would be prohibitive economically, in addition to presenting a serious waste disposal problem.

I have now found that hydrochloric acid relatively free of water can be obtained easily and economically, without production of a large quantity of spent dehydrating agent, by reacting aqueous hydrochloric acid with compounds which decompose with water to form hydrochloric and sulfuric acids as decomposition products.

According to one form of the invention I may react aqueous hydrochloric acid with chlorosulfonic acid so as to produce gaseous hydrochloric acid of any desired moisture content according to the concentration of the sulfuric acid formed. In this reaction hydrogen chloride is liberated by decomposition of the chlorosulfonic acid and additionally by the simultaneous stripping of the aqueous hydrochloric acid. These two reactions mutually contribute complementary functions so that the net result exceeds that obtainable if the reactions are separated.

Chlorosulfonic acid reacts violently with water. The products normally are hydrogen chloride and sulfuric acid. Under certain conditions, however, appreciable quantities of sulfur trioxide gas are liberated. The reaction is strongly exothermic, the heat of the reaction amounting to about 11,000 B. t. u. per pound mole. If an excess of water is used, further heat is liberated as the heat of dilution of the sulfuric acid formed. Hence, if anhydrous hydrochloric acid were to be obtained by the decomposition of chlorosulfonic acid with water, no advantage would be obtained by reason of an excess of water. This is not the case in the processes of my invention because the heat of vaporization of the hydrogen chloride from the aqueous hydrochloric acid tends to offset the heat of dilution of the sulfuric acid. If a strong hydrochloric acid is employed the heat of vaporization may be greater than the heat of dilution of the sulfuric acid formed. Thus, according to my invention I can react chlorosulfonic acid with an excess of aqueous hydrochloric acid and obtain as much as 50 per cent or more of the hydrochloric acid involved in the reaction from the aqueous hydrochloric acid without generating more heat than can be easily and economically taken care of. Thus the temperature and concentration of the acid formed can readily be controlled to avoid excessive carry over of sulfuric acid or water vapor.

According to one form of the invention the aqueous hydrochloric acid and the chlorosulfonic acid are added slowly to a body of sulfuric acid of suitable strength. In the course of the reaction sulfuric acid accumulates as a decomposition product. Sufficient of this is allowed to accumulate to provide the above-mentioned body of sulfuric acid. The reagents are added in the proportions required to maintain the strength of the sulfuric acid. The additions are made gradually and no agitation is required provided the hydrochloric acid is always slightly in excess. An excess of chlorosulfonic acid should be avoided, for, unless agitation is provided, the reaction becomes violent and liberates sulfur trioxide to a considerable extent. The operation may be carried out at room temperature without substantial rise in temperature. A typical operation is illustrated in the following example, in which the parts are by weight unless otherwise specified:

*Example 1*

The reactants, 187.5 parts of 22.0° Bé. hydrochloric acid (34.64% HCl) and 236.5 parts of 99% chlorosulfonic acid, are introduced separately and simultaneously thru glass tubes below the surface of 1250 parts of 55° Bé. (69.65%) $H_2SO_4$ contained in a Woolf bottle. The rates of addition are regulated to provide a slight excess (about 10%) of hydrochloric acid solution over that required for decomposing the chlorosulfonic acid. The hydrochloric acid evolved is passed thru 98% sulfuric acid and then collected in sodium hydroxide solution.

From the increase in weight of the 98% sulfuric acid the per cent of water and sulfuric acid (as sulfur trioxide) which passes over can be determined. In a typical operation the water and sulfur trioxide is less than 1% combined. If the 98% sulfuric acid wash is omitted, the amount of sulfate passing over can be determined by analysis of the hydroxide solution. In a typical operation the sulfur trioxide in the evolved gas is about 0.4 per cent.

The heat of the reaction is absorbed by the heel of sulfuric acid so that the temperature rise does not exceed about 15 degrees.

The reaction may be carried out either batchwise or continuously. In the latter case the reagents are added continuously in the proportions indicated and the sulfuric acid formed is withdrawn either continuously or intermittently as most convenient.

According to another form of the invention the hydrochloric acid is added gradually with proper agitation to the chlorosulfonic acid, the addition being made as required to supply the desired amount of anhydrous hydrochloric acid and being continued so long as a sufficiently dry gas is obtained. The aqueous hydrochloric acid should be added gradually and with good agitation in order to prevent local overheating. This form of the invention is illustrated in the following example, in which the parts are by weight unless otherwise specified:

*Example 2*

An enameled kettle, provided with an agitator, is charged with 118 parts of 99% chlorosulfonic acid. 20 Baumé hydrochloric acid is added gradually with agitation until about 36.5 parts have been added. The evolved anhydrous hydrochloric acid is passed thru a column packed with quartz to scrub out any sulfuric acid evolved. The overall temperature rise does not exceed about 80° F. and the final acid strength is about 93% (66° Bé.). At these temperatures and concentrations the vapor pressure of water and sulfuric acid is negligible and a gas containing less than 1% water and sulfuric acid is obtained.

When the process is repeated, using water instead of aqueous hydrochloric acid, the temperature rise is about 420° F. as compared with 80° F. as in the example. At this temperature the vapor pressures of water and sulfuric acid over the 66° Bé. sulfuric acid are such that the gas evolved would contain over 3% water and sulfuric acid.

While I have illustrated two methods of carrying out my invention I do not wish to be limited thereto, and it is to be understood that many variations may be made without departing from the spirit of the invention, depending upon the degree of dehydration desired, the tolerance for sulfuric acid and other particular requirements of individual operations.

According to a preferred form of the invention the reaction is carried out in a body of liquid of sufficient mass adequately to absorb the heat of the reaction. For example, the two reagents may be added to a body of sulfuric acid as in Example 1, or the aqueous hydrochloric acid may be added to a body of the chlorosulfonic acid as in Example 2. It will be understood, however, that other methods of dissipating the heat of the reaction may be employed.

In place of chlorosulfonic acid I may use other materials which are decomposed by water to give sulfuric acid and hydrochloric acid. The mixed anhydrides of hydrochloric acid and sulfuric acid, of which chlorosulfonic acid, sulfuryl chloride and pyrosulfuryl chloride are typical, are suitable. These mixed anhydrides may be used in various processes of the character illustrated if the quantity is adjusted suitably. Sulfuryl chloride, for example, may replace chlorosulfonic acid mol for mol and pyrosulfuryl chloride may replace it one-half mol per mol.

The proportions of the reactants may be varied widely according to the nature of the method employed for reacting them and according to the nature of the product desired. Preferably, however, an excess of aqueous hydrochloric acid is employed since, in the first place, no advantage is obtained by having unreacted chlorosulfonic acid or other mixed anhydride left over and, in the second place, a substantial advantage in cost efficiency is obtained with an excess of hydrochloric acid. An equivalent of hydrochloric acid is to be considered that quantity which contains sufficient water completely to decompose the chlorosulfonic acid or other mixed anhydride, and an excess is to be considered a greater quantity. In other words, an excess of hydrochloric acid means that sufficient water is provided not only to decompose all of the chlorosulfonic acid or other mixed anhydride but also to dilute the sulfuric acid formed. In some methods, as in Example 2, part of the reaction will be carried out in the presence of excess chlorosulfonic acid or other mixed anhydride, but in such cases the proportions are determined as those entering into the whole of the reaction, as in Example 2 the proportions which ultimately give 66° Bé. sulfuric acid.

While it is desirable to employ aqueous hydrochloric acid in excess it is also undesirable to employ it in too great an excess because if the sulfuric acid formed is too dilute too much water vapor will pass over with the hydrochloric acid gas. Considerable hydrochloric acid will also be lost, since solubility of hydrochloric acid in the heel is inversely proportional to the sulfuric acid concentration. If the accumulated body of sulfuric acid is maintained at a relatively high temperature loss of hydrochloric acid in this manner is reduced but at the same time the vapor pressure is increased. With these factors in mind those skilled in the art will readily be able to determine the most suitable proportions for any given operation. In general, however, it is desirable to employ sufficient chlorosulfonic acid to keep the concentration of sulfuric acid formed above about 60 per cent. Optimum conditions obtain when the proportion of aqueous hydrochloric acid to chlorosulfonic acid is such that the concentration of the sulfuric acid formed is between 70 and 100 per cent.

The strength of the aqueous hydrochloric acid may be varied widely but no advantage is obtained by using a dilute acid. Acids of commerce such as 20° and 22° Bé. acids are most suitable, and of course more concentrated acids would produce a more favorable heat balance. Dilute acids are less desirable and increase the expense and difficulty of operation. While the process may be operated with acid of any strength the full advantages of the invention are not obtained unless the acid contains at least 20 per cent hydrochloric acid. The upper limit is determined by the solubility of hydrochloric acid in water as well as by the strength commercially available.

I claim:

1. In the manufacture of hydrogen chloride gas by vaporization from commercial aqueous hydrochloric acid the step of mixing aqueous hydrochloric acid with a substance which is decomposed by water to hydrochloric acid and sulfuric acid as decomposition products.

2. In the manufacture of hydrogen chloride gas by vaporization from commercial aqueous hydrochloric acid the step of mixing a substance which is decomposed by water to hydrochloric acid and sulfuric acid as decomposition products with an excess of the aqueous hydrochloric acid.

3. In the manufacture of dry hydrochloric acid gas by vaporization from commercial aqueous hydrochloric acid the step of mixing an excess of the aqueous hydrochloric acid with sufficient substance which is decomposed by water to hydrochloric acid and sulfuric acid as decomposition products to provide a sulfuric acid concentration of at least 60 per cent.

4. In the manufacture of dry hydrochloric acid gas by vaporization from commercial aqueous hydrochloric acid the step of mixing an excess of the aqueous hydrochloric acid containing at least 20% hydrogen chloride with sufficient substance which is decomposed by water to hydrochloric acid and sulfuric acid as decomposition products to give an aqueous sulfuric acid of at least 60% strength.

5. In the manufacture of hydrogen chloride gas by vaporization from commercial aqueous hydrochloric acid the step of mixing the aqueous hydrochloric acid with a mixed anhydride of sulfuric and hydrochloric acid.

6. In the manufacture of hydrogen chloride gas by vaporization from commercial aqueous hydrochloric acid the step of mixing a mixed anhydride of sulfuric acid and hydrochloric acid with an excess of the aqueous hydrochloric acid.

7. In the manufacture of dry hydrochloric acid gas by vaporization from commercial aqueous hydrochloric acid the step of mixing an excess of the aqueous hydrochloric acid with sufficient mixed anhydride of sulfuric and hydrochloric acids to provide a sulfuric acid concentration of at least 60 per cent.

8. In the manufacture of dry hydrochloric acid gas by vaporization from commercial aqueous hydrochloric acid the step of mixing an excess of the aqueous hydrochloric acid containing at least 20% hydrogen chloride with sufficient mixed anhydride of sulfuric and hydrochloric acids to give aqueous sulfuric acid of at least 60% strength.

9. In the manufacture of hydrogen chloride gas by vaporization from commercial aqueous hydrochloric acid the step of mixing aqueous hydrochloric acid with chlorosulfonic acid.

10. In the manufacture of hydrogen chloride gas by vaporization from commercial aqueous hydrochloric acid the step of mixing chlorosulfonic acid with an excess of the aqueous hydrochloric acid.

11. In the manufacture of dry hydrochloric acid gas by vaporization from commercial aqueous hydrochloric acid the step of mixing an excess of the aqueous hydrochloric acid with sufficient chlorosulfonic acid to provide a sulfuric acid concentration of at least 60 per cent.

12. In the manufacture of dry hydrochloric acid gas by vaporization from commercial aqueous hydrochloric acid the step of mixing an excess of the aqueous hydrochloric acid containing at least 20% hydrogen chloride with sufficient chlorosulfonic acid to give aqueous sulfuric acid of at least 60% strength.

13. In the manufacture of dry hydrochloric acid gas by vaporization from commercial aqueous hydrochloric acid the step of mixing the aqueous hydrochloric acid of at least 20% strength with a mixed anhydride of sulfuric and hydrochloric acids in proportions such that the sulfuric acid formed has a strength of about 60 to 100 per cent.

FRANK L. FROST, Jr.